June 17, 1930.  L. C. BAYLES  1,763,683

OILING DEVICE

Filed Sept. 3, 1927

INVENTOR.
Lewis C. Bayles
BY
HIS ATTORNEY

Patented June 17, 1930

1,763,683

UNITED STATES PATENT OFFICE

LEWIS C. BAYLES, OF EASTON, PENNSYLVANIA, ASSIGNOR TO INGERSOLL-RAND COMPANY, OF JERSEY CITY, NEW JERSEY, A CORPORATION OF NEW JERSEY

OILING DEVICE

Application filed September 3, 1927. Serial No. 217,428.

This invention relates to oiling devices, but more particularly to an oiling device designed to be placed in a pressure fluid line carrying pressure to a fluid actuated engine or motor.

One object of this invention is to provide an oiling device simple and cheap to manufacture and which will at all times supply oil to the motor regardless of the position in which the oiler is placed.

Other objects will be in part obvious and in part pointed out hereinafter.

Figure 1:
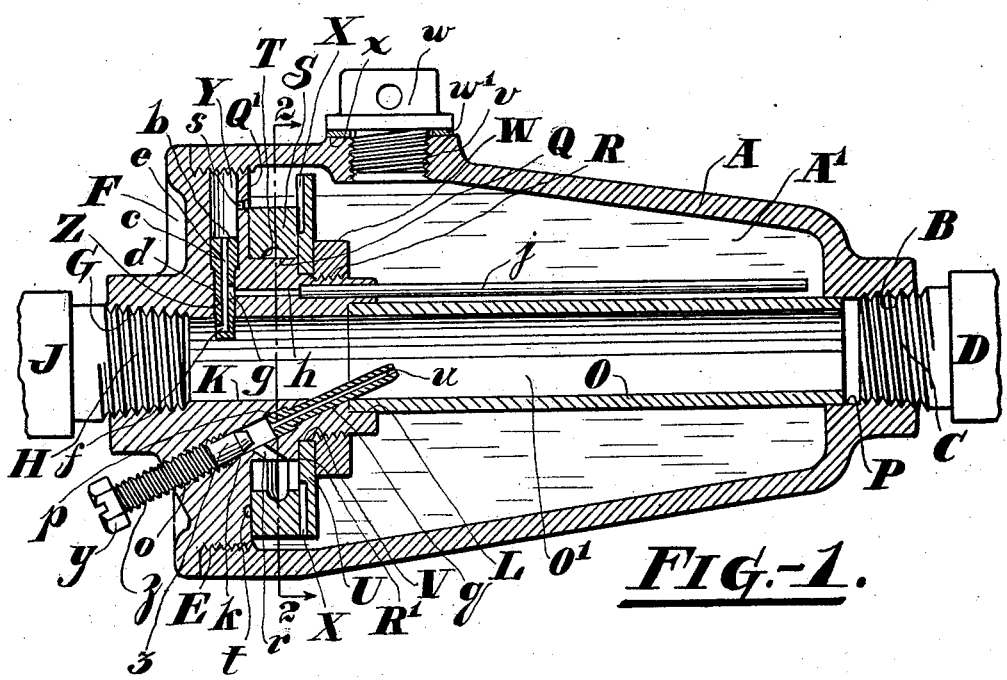
Figure 1 is a longitudinal sectional view of the oiler.
Figure 2:
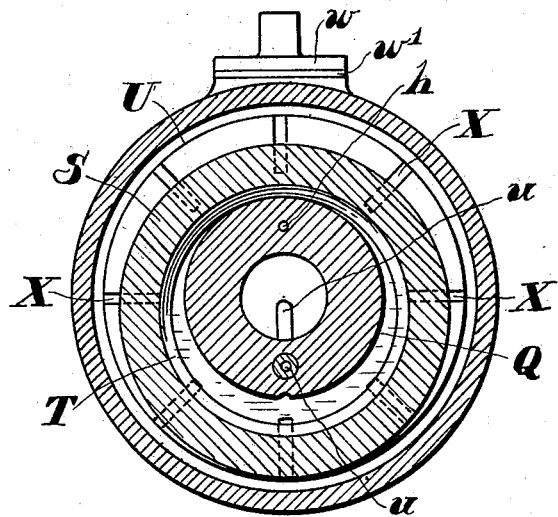
Figure 2 is a transverse sectional view taken on the line 2—2 of Figure 1 and looking in the direction indicated by the arrows.

Referring more particularly to the drawings, A is a casing internally threaded at B to receive the corresponding threads C of a fluid pressure pipe D. At the opposite end of the casing A is a larger threaded opening E into which is screwed a plug F having an internally threaded aperture G adapted to receive the threaded end H of a fluid pressure pipe J. Through the plug F a passage K is formed which has an enlarged portion L at its end. This enlarged portion is adapted to receive a tube O which extends longitudinally through the casing A and into an aperture P at the end of the casing.

The end of the plug F which enters the casing A has a reduced portion Q cylindrical in form and a further reduced and threaded portion R. By this stepped reduction of the plug end faces Q' and R' are formed. A heavy ring S having an internal diameter somewhat larger than the reduced portion Q of the plug F surrounds this reduced portion. An annular groove or channel T is cut in the inner face of the ring S. A second ring or washer U having a central aperture V fits over the threaded portion R of the plug F and cooperates with the end face Q' to form a guideway for the ring S. The ring U is held in place against the face R' by a nut W screwed onto the threaded portion R. Radial grooves X are cut in the face of the ring U and this face is brought in contact with the ring S in assembling the oiler.

A hole Y drilled in the plug F has a reduced portion Z and a tube $b$ having a head $c$ and a stem, or reduced portion $d$ fits the hole Y tightly enough to prevent accidental turning of the tube $b$ relative to the hole Y. A hole $e$ is drilled longitudinally through the tube $b$ and meets a second hole $f$ at substantially right angles near the lower end of the tube. Approximately midway between the ends of the tube $b$, a second hole $g$ is drilled at right angles to the hole $e$. This hole $g$ communicates with a passage $h$ in the plug F and a tube $j$ extends from passage $h$ to the right hand end of the casing A.

An inclined hole $k$ is formed in the plug F and has a threaded portion $o$, a reduced portion $p$ and a further reduced portion $q$. From the cylindrical portion Q of the plug F a passage $r$ extends communicating with the hole $k$ and a nozzle $u$ extends from the hole $k$ into the tube O. A passage $s$ forms a communication between the hole Y and a ring groove $t$.

In nearly all operations where compressed air tools are used, the tools and the accompanying apparatus, such as air hose and oilers, are necessarily subjected to some rough usage. Under these conditions it is impossible to keep an oiler in a fixed position in which it may have been designed to operate most efficiently. To overcome this difficulty and objection to the type of oiler which is connected in a hose line the present invention was devised, its operation being as follows:

A reservoir A' formed by the casing A is filled with lubricant through the hole $v$ and the hole closed by a threaded plug $w$ which has a gasket or washer $w'$ between it and the seat $x$ on the casing. The pressure fluid used to operate the pneumatic tool (not shown) passes from the hose or pipe J through a passage O' in the oiler and out to the tool through hose or pipe D. The object of the oiler being placed in the line is to get a suitable quantity of lubricant into the passing stream of pressure fluid and thus into the tool being driven by the pressure fluid.

There is enough clearance between the face Q' and the ring U to permit the ring S to take the lowest possible position regardless of the position of the casing A. The lubricant will also seek the lowest part of the casing and pressure fluid is admitted to the reservoir through the passages f, e, Y, s and t. It is obvious that as the ring U always falls to the lowest position, a portion of the ring groove t will always be uncovered to admit pressure fluid to the reservoir A'. The pressure fluid thus admitted forces lubricant into the lowermost radial grooves X. This lubricant enters the chamber formed between the cylindrical surface of the reduced portion Q of plug F and the innermost face of the ring S. It will be noted that the passage r may not take the position shown in the drawing but is just as apt to be found vertically over the place in which it is shown. In such a contingency the annular channel T will carry the lubricant up to the passage r. After the lubricant passes through the passage r it is forced out of the nozzle u and into the stream of pressure fluid to be carried to the pneumatic tool (not shown). In the event that the oiler assumes a nearly vertical position with the end B upward, the tube j will carry pressure fluid to the top of the lubricant.

The flow of lubricant into the pressure fluid passage O' is regulated by a needle valve y which has a threaded portion z cooperating with a threaded hole o in the plug F. By turning the needle valve y, the passage r may be covered or uncovered by the cylindrical end 3 of the needle valve, thus regulating the quantity of oil admitted to the passage O'.

I claim:

1. In a lubricator, the combination with a casing having a lubricant reservoir and a passageway therethrough, a ring loosely mounted laterally, said ring having a channel in its inner periphery for directing lubricant from the reservoir into the passageway, and a tube leading from the passageway into the reservoir for conducting pressure fluid from the passageway into the reservoir, and a bearing on the casing around the passageway of less diameter than internal diameter of the ring to support the ring.

2. In a lubricator, the combination with a casing having a lubricant reservoir and a passageway therethrough, a ring having a channel in its inner periphery, said ring so mounted around the passageway that the said channel will continuously carry lubricant to said passageway, a tube leading from the passageway into the reservoir for conducting pressure fluid from the passageway into the reservoir, and a second tube leading from said first tube to deliver pressure fluid from the passageway to the reservoir when the said lubricator is in such positions that the said first tube cannot function.

3. In a lubricator, the combination with a casing having a lubricant reservoir and a passageway therethrough, a fixed ring having radial grooves therein, a loosely mounted ring having an annular channel therein, said radial grooves carrying lubricant to said annular channel, said annular channel carrying said lubricant to said passageway, a tube leading from the passageway into the reservoir for conducting pressure fluid from the passageway into the reservoir, and a second tube leading from said first tube to deliver pressure fluid from the passageway to the reservoir when the said lubricator is in such positions that the said first tube cannot function.

4. In a lubricator, the combination of a casing and a plug in the casing forming an end wall thereof, means for dividing said casing into a reservoir for lubricant and an open ended passageway for fluid, means cooperating with the plug to form a guideway about said dividing means, and a ring loosely mounted in the guideway and adapted to direct lubricant from the reservoir into the passageway.

5. In a lubricator, the combination of a casing and a plug in the casing forming an end wall thereof, means for dividing the casing into a reservoir for lubricant and an open ended passageway for fluid, a ring member cooperating with the plug to form a guideway about said means, grooves in said ring member, and a ring loosely mounted in the guideway and cooperating with said grooves to direct lubricant from the lowest point of the reservoir into the passageway.

6. In a lubricator, the combination of a casing and a plug in the casing forming an end wall thereof, means for dividing the casing into a reservoir for lubricant and an open ended passageway for fluid, a ring member cooperating with the plug to form a guideway about said means, grooves in the ring member, an annular groove in the plug communicating with the passageway, and a ring loosely mounted in the guideway and adapted to control the admission of pressure fluid from the annular groove into the reservoir and to cooperate with the grooves in the ring member for directing lubricant from the lowest point of the reservoir into the passageway.

In testimony whereof I have signed this specification.

LEWIS C. BAYLES.